May 7, 1963 S. H. CREED ET AL 3,088,509
PEAR BOBBER
Original Filed Nov. 30, 1956 9 Sheets-Sheet 1

FIG_1

INVENTORS
SHERMAN H. CREED
SANDOR CSIMMA
BY *Hans G. Hoffmeister*
ATTORNEY

May 7, 1963 S. H. CREED ET AL 3,088,509
PEAR BOBBER
Original Filed Nov. 30, 1956 9 Sheets-Sheet 3

FIG_3

INVENTORS
SHERMAN H. CREED
SANDOR CSIMMA
BY Hans G. Hoffmeister
ATTORNEY

May 7, 1963  S. H. CREED ET AL  3,088,509
PEAR BOBBER

Original Filed Nov. 30, 1956  9 Sheets-Sheet 8

INVENTORS
SHERMAN H. CREED
SANDOR CSIMMA
BY *Hans G. Hoffmeister*
ATTORNEY

May 7, 1963    S. H. CREED ET AL    3,088,509
PEAR BOBBER
Original Filed Nov. 30, 1956    9 Sheets-Sheet 9

INVENTORS
SHERMAN H. CREED
SANDOR CSIMMA
BY Hans G. Hoffmister
ATTORNEY

United States Patent Office 3,088,509
Patented May 7, 1963

3,088,509
PEAR BOBBER
Sherman H. Creed, San Jose, and Sandor Csimma, Sunnyvale, Calif., assignors to FMC Corporation, a corporation of Delaware
Original application Nov. 30, 1956, Ser. No. 625,368, now Patent No. 2,979,093, dated Apr. 11, 1961. Divided and this application Nov. 20, 1959, Ser. No. 854,335
5 Claims. (Cl. 146—81)

This invention appertains to a fruit handling machine and more particularly relates to a stem trimming mechanism for preparing fruit, such as pears, for canning.

This application is a division of copending application Serial No. 625,368 filed November 30, 1956, now Patent No. 2,979,093 which issued on April 11, 1961.

An object of the present invention is to provide an improved stem trimming mechanism for a fruit preparation machine.

Another object is to provide a stem trimming mechanism adapted to trim the stem end portion from a pear at a predetermined distance from the stem end thereof.

Other and further objects and advantages of the present invention will become apparent from the following description taken in connection with the accompanying drawings:

Figure 1:
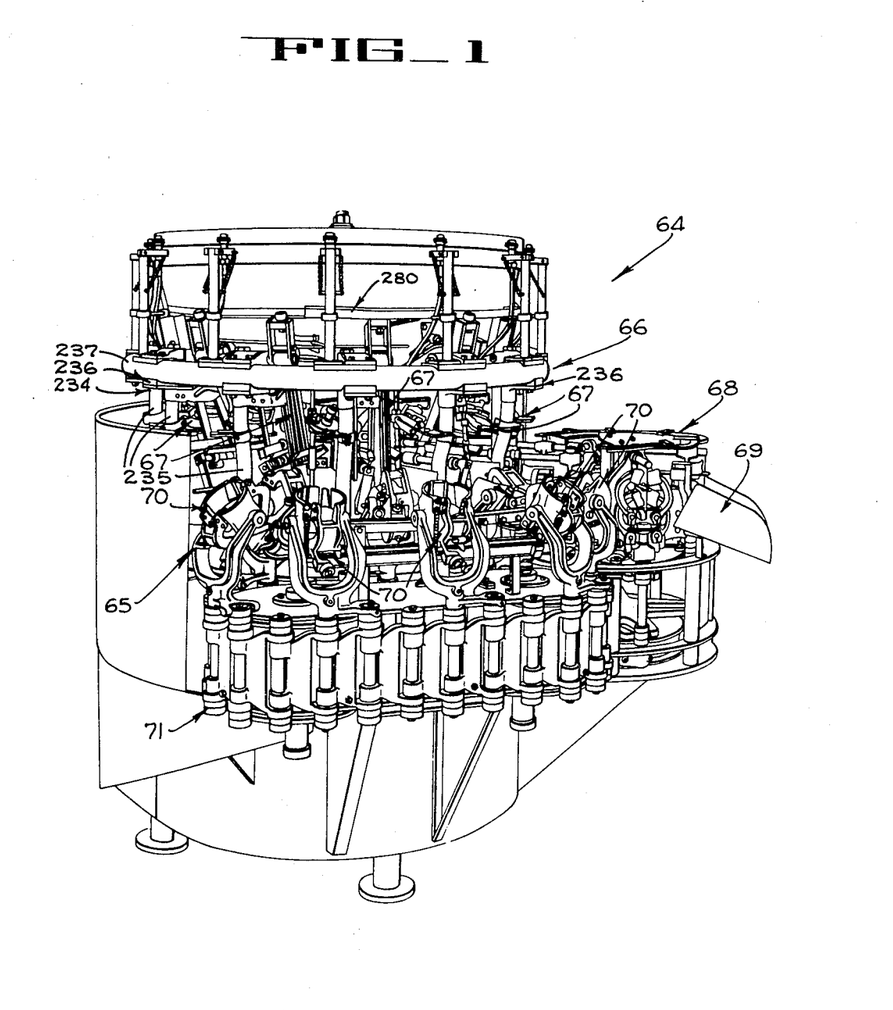
FIG. 1 is a perspective of the fruit preparation machine of the present invention.
Figure 2:
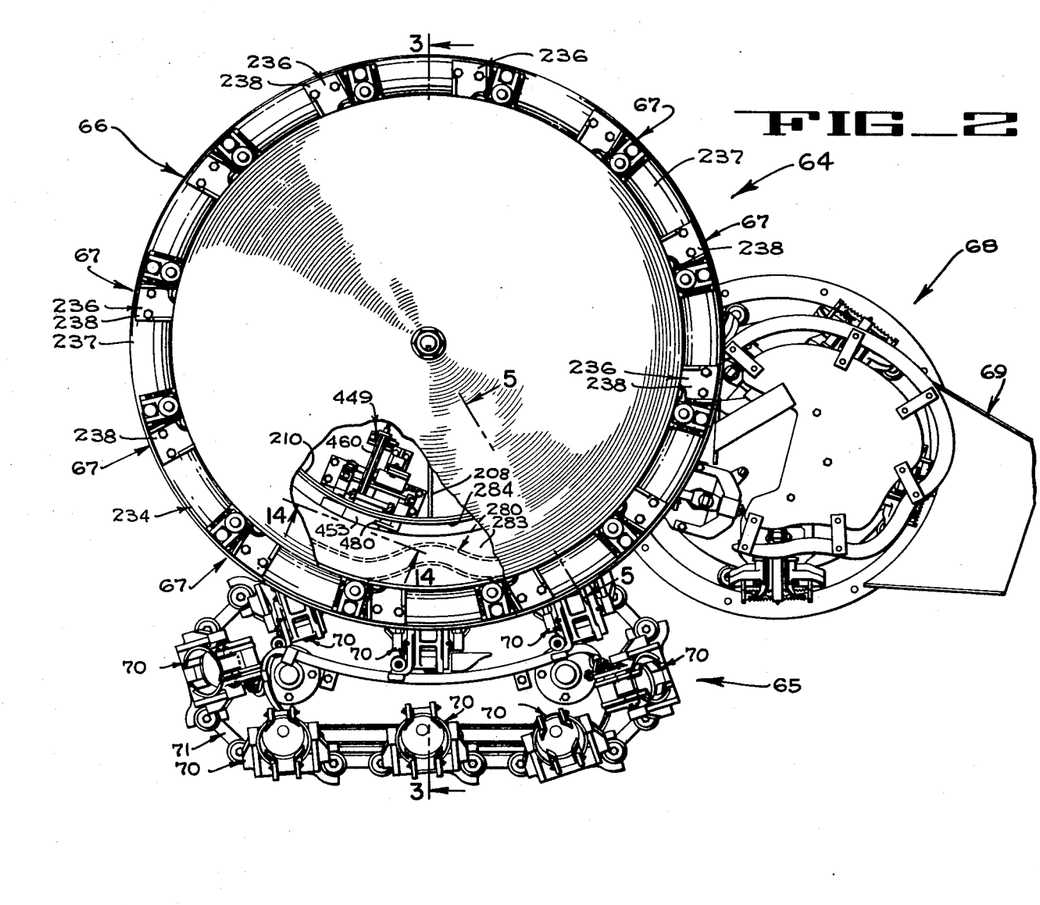
FIG. 2 is a plan view of the machine of FIG. 1 with a portion of the top broken away.
Figure 3:
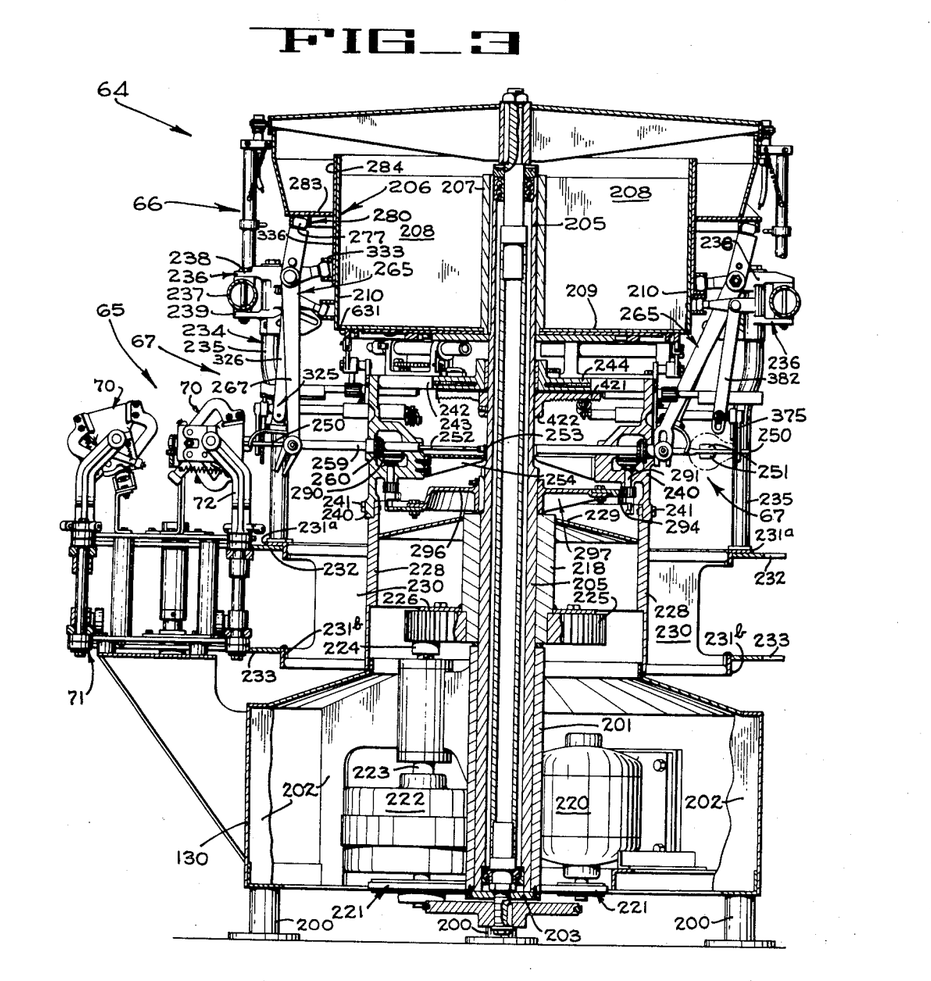
FIG. 3 is a vertical section taken on line 3—3 of FIG. 2.

The rotary pear processing machine, of which the stem trimming mechanism of the present invention is a part, is indicated generally in FIGS. 1, 2 and 3 by the reference numeral 64 and comprises a pear feed mechanism 65, a rotary main turret 66 which carries a plurality of peeling, coring and stem-end trimming units 67, and a discharge turret 68 which receives each peeled, cored and trimmed pear from the main turret 66 and performs successive splitting, seed-cell removing, and blossom-end trimming operations prior to depositing the two halves of the pear on a discharge chute 69.

Figure 4:
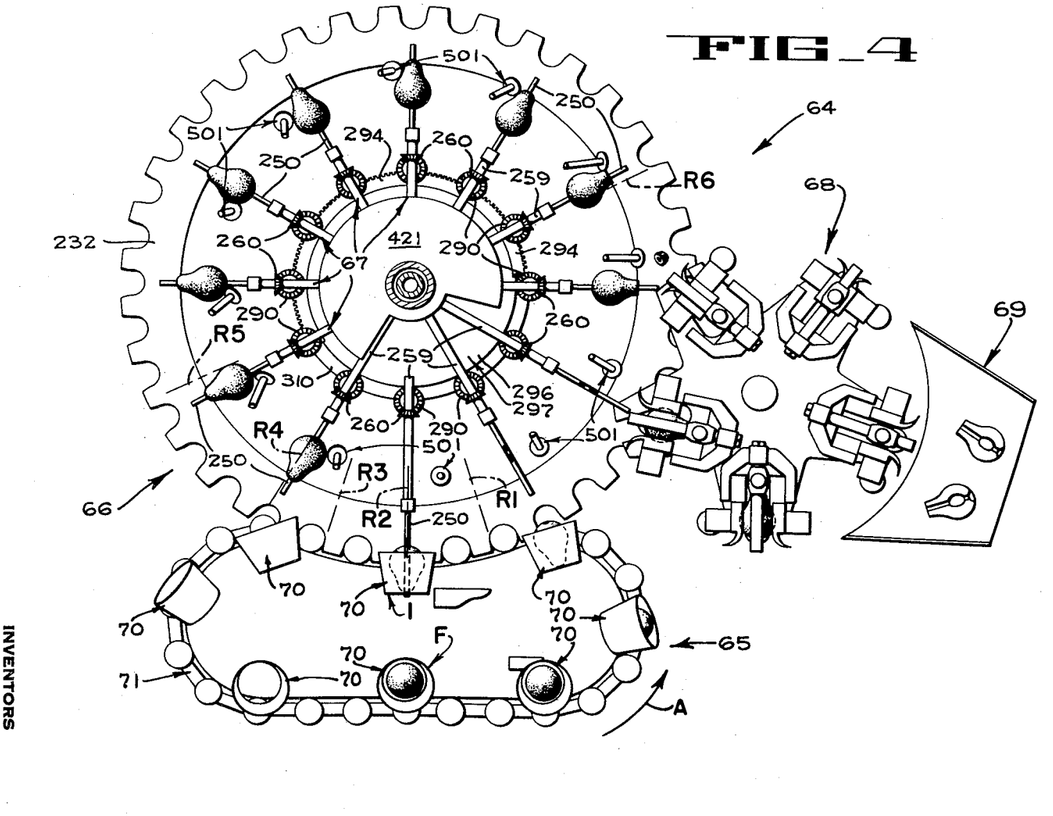
FIG. 4 is a diagrammatic plan view of a portion of the operating mechanism of the machine of FIG. 1.

Pears are individually fed by hand, stem end down, into feed cups 70 which are mounted on an endless chain carrier 71 that moves the cups 70 in a circuitous path in the direction of the arrow A (FIG. 4). The feed cups 70 are arranged to move the pears from a feed station F where their stem-blossom axes are substantially vertical, to an impaling station I where said axes are horizontally disposed. At the impaling station I of the main turret 66, one of several stemming tubes 250 is moved radially outward of the turret 66 and impales one of the pears at its blossom end and along its stem-blossom axis. While supported on the stemming tube 250, the stem and a portion of the seed cell of the pear is removed, the pear is peeled by one of several peeling mechanisms, and the stem end of the pear is severed from the body of the pear by the mechanism of the present invention. The parts of the feed mechanism 65 are described in detail in the above-identified parent application to which reference may be had for a description of the entire machine.

*Support Structure and Drive Mechanism*

Referring to FIG. 3, it will be noted that a cylindrical base 130 has three support posts 200 which rest on a surface such as a floor. An upright tubular member 201 is disposed concentrically of the base at the center thereof and is rigidly secured to the base by a plurality of radially extending flanges 202. An aperture plate 203 is bolted across the lower end of the tubular support member 201 and a main shaft 205 is bottomed on the plate 203 inside the stationary support member 201 to which it may be secured by any suitable means as by bolts. A cylindrical drum 206 is mounted in supported relation at the upper end of the stationary shaft 205. The drum has a central tubular member 207 and a plurality of radial webs 208 which connect the central tubular member 207 to a base plate 209 and an outer wall 210. The drum is supported by the stationary support shaft 205 and is keyed thereto so that the drum cannot rotate and, accordingly, it provides a suitable support for several stationary cams which control operating mechanisms of the machine, as will be explained presently.

In the present pear processing machine, the rotary turret 66 carries twelve separate and complete processing units 67 which are schematically shown in FIG. 4. As the turret 66 rotates clockwise, each unit removes a pear from a feed cup, firmly seats the pear on a stemming tube, peels the pear, and cuts off the stem end of the pear. By the time these operations are completed, the unit is disposed adjacent the discharge turret 68 to which the pear is transferred.

The turret 66 (FIG. 3) comprises a tubular drive member 218, which is disposed at the center of the machine around the stationary main shaft 205. The member 218 is driven by a motor 220 through a belt and pulley drive 221, a transmission unit 222, a drive shaft 223, a pinion 224 on the shaft 223, and a gear 25 that is bolted to a plate 226 (FIG. 3) which is welded to the drive member 218. Near its upper end the drive member 218 is rigidly connected to an outer cylindrical drive member 228 through a rigid, frusto-conical member 229. Thus, when the motor 220 is energized, the outer drive member 228 of the turret 66 is continuously rotated.

The outer cylindrical drive member 228 carries a plurality of vertical plates 230 which are welded to the member 228 and project radially outwardly therefrom. A circular angle bar 231a (FIG. 3) is rigidly secured around the upper, outermost edges of the plates 230, and a circular strap 231b is welded around the lower outermost edges of the plates 230. A horizontal upper sprocket ring 232 (FIGS. 3 and 4) is secured to the upper flange 231a, and a lower sprocket ring 233 (FIG. 3) is secured to the lower strap 231b. The sprocket rings 232 and 233 drive the cup carrier 71 in synchronism with the several processing units 67 on the turret 66.

A framework 234 (FIGS. 2 and 3) is formed around the drum 206 by means of a plurality of vertical tubular members 235 which are mounted in upright spaced position on the upper surface of the circular angle bar 231a. A casting 236 (FIG. 5) is bolted on the upper end of each tubular member 235, and the several castings 236 are connected together by a tubular ring 237 which is bolted between spaced arms 238 and 239 of each casting. The castings 236 provide mounting means for mechanism of each pear processing unit 67 and accordingly, one upstanding tubular member 235 is disposed radially outwardly from each processing unit 67.

*Pear Processing Units on Main Turret*

Figure 8:
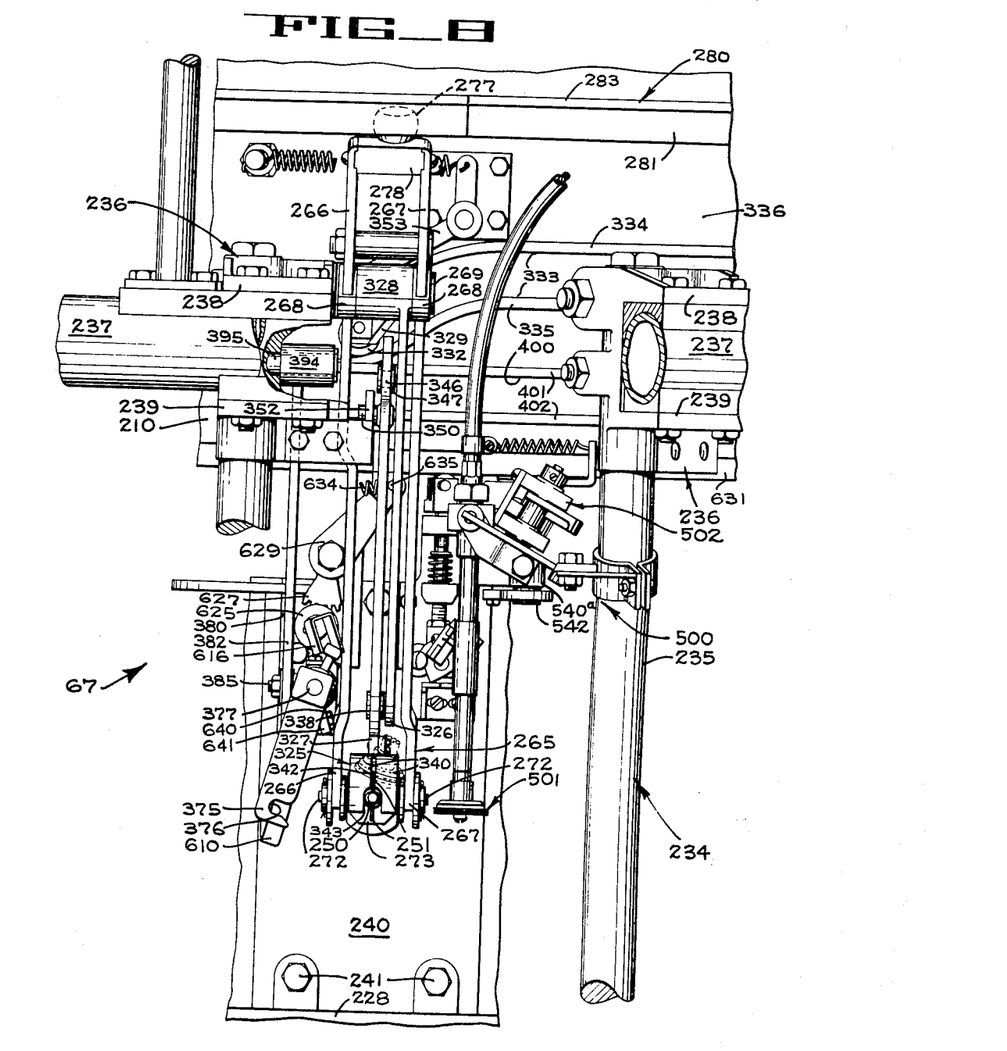
FIG. 8 is an enlarged fragmentary elevation of a portion of the main turret of the machine of FIG. 1 taken in the direction of arrows 8—8 of FIG. 5, particularly showing one of the several processing units on the main turret.

The twelve pear processing units 67 (FIGS. 4, 5 and 8) are identical, each unit comprising a vertical mounting plate 240 which is secured at its lower end to the outer drive member 228 of the turret by bolts 241. At the upper end of the mounting plate, a bolt 242 projects through the plate 240, and through a spacer sleeve 243 (FIG. 5) and is threaded in a hub plate 244 that is supported from the stationary main shaft 205 and mounted for rotation relative thereto. Each processing unit 67 includes one of the stemming tubes 250 (FIG. 5) and includes a pair of diametrically opposed fins 251. A stationary ejector rod 252 is disposed inside the stemming tube 250 and is connected at its innermost end to a tab 253 (FIG. 3) that extends upward from the inner end of a bracket 254 that is secured to the mounting plate 240.

The stemming tube 250 carries a tubular end portion 255 (FIG. 6) that is pressed on the tube 250 and is locked between a nut 257 and a shoulder 258 formed internally in a tubular drive member 259 on which a bevel gear 260 is keyed. With this arrangement, the stemming tube 250 is rotated when the gear 260 is driven and, at the same time, the stemming tube may be slid in and out of the mounting plate 240 which rotatably journals gear 260.

Figure 9:
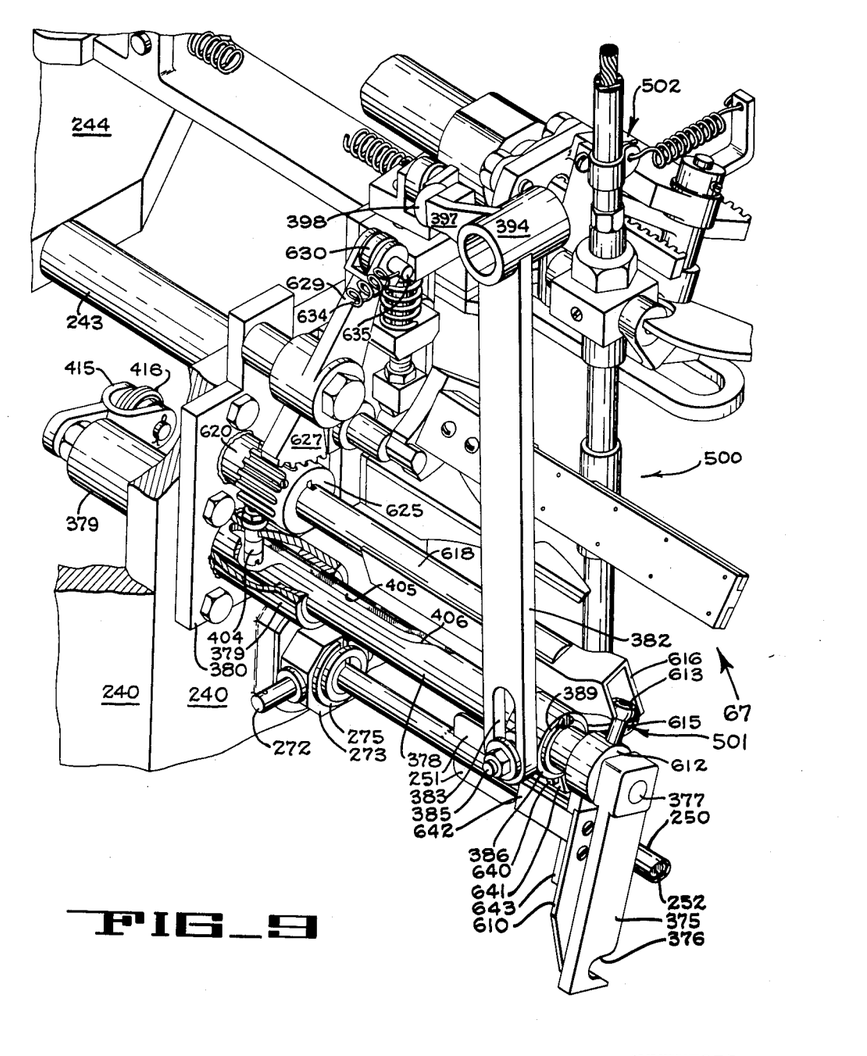
FIG. 9 is a fragmentary perspective of the processing unit shown in FIG. 8, parts being omitted and parts shown in section to fully disclose the operating mechanism.

The stemming tube 250 is moved in a radial direction in the mounting plate 240 by means of a lever 265 (FIGS. 5 and 8) which has two substantially identical, spaced arms 266 and 267. Each arm has a hub 268 mounted for pivoting movement on a short shaft 269 that projects outwardly from the casting 236. At its lower end, each lever arm 266 and 267 has a forked end portion 271 (FIG. 5) that has arms disposed on opposite sides of a pin 272 (FIG. 8) which projects outwardly from each side of a bearing block 273 (FIG. 9). The bearing blocking 273 is locked on the tubular drive member 259 (FIG. 6) of the stemming tube 250 by means of snap rings 275. As the lever 265 is pivoted about the short shaft 269, the forked ends of the lever move the stemming tube radially in or out of the mounting plate 240 of the turret.

The lever 265 is pivoted about shaft 269 by means of a cam follower roller 277 (FIG. 5) that is rotatably mounted on a bar 278 that is secured between the upper ends of the lever arms 266 and 267. The roller 277 is disposed in a cam track 280 formed between two flanges 281 and 282 which projects downwardly from a horizontal plate 283. This plate 283 is rigidly secured to a circular member 284 that is welded to the exterior surface of the stationary drum 206. As seen in dotted lines in FIG. 2, the cam track 280 is bent inwardly at a point approximately directly opposite the longitudinal midpoint of the frame on which the cup carrier is mounted. As will be explained presently, when the cam follower 277 rides inwardly along this inwardly bent portion of the camming track, the stemming tube is carried radially outwardly of the main turret to impale a pear in the feed cup.

Each stemming tube is rotated by a bevel gear 290 (FIG. 5) that is in mesh with the bevel gear 260 which is keyed in driving relation on the drive member 259. The gear 290 is keyed to a vertical shaft 291 that is journalled in a lower wall 292 of a box-like extension of the mounting plate 240. At its lower end, the shaft 291 carries a gear 293 which is arranged to move into contact with a stationary gear segment 294 (FIG. 4) that partially encircles the main shaft 205. This gear segment 294 is secured to a plate 296 (FIG. 3) which projects horizontally from a hub of a stationary circular mounting member 297 that is keyed to the stationary main shaft 205. Accordingly, while the gear 293 is moved continuously with the turret in a circular path, it is rotated about its own axis only during a portion of its movemen in said circular path. As will be explained hereinafter, the pear is peeled while it is being rotated on the stemming tube, and therefore the rotation of the stemming tube corresponds in lengh to the peeling phase of the pear processing cycle.

Figure 10:
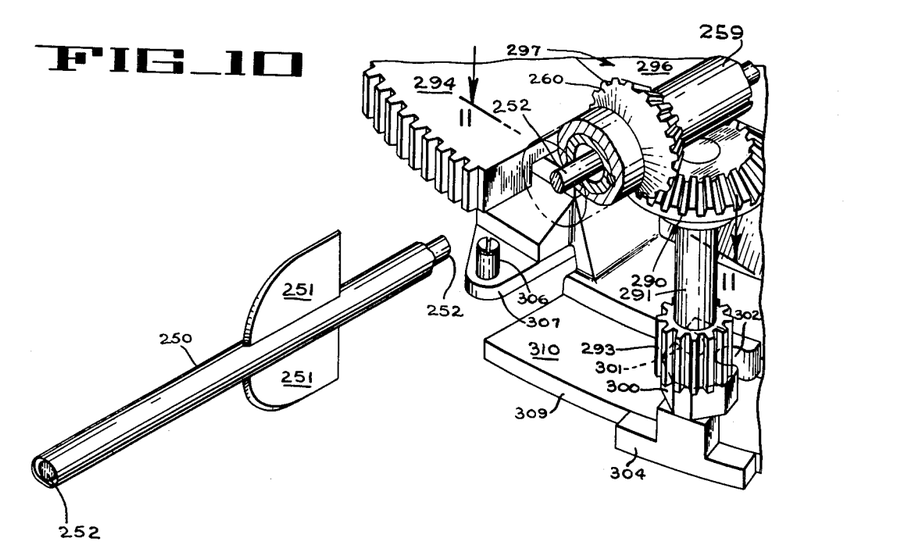
FIG. 10 is a fragmentary, enlarged perspective of the stemming tube drive mechanism of the machine of FIG. 1.
Figures 11, 12:
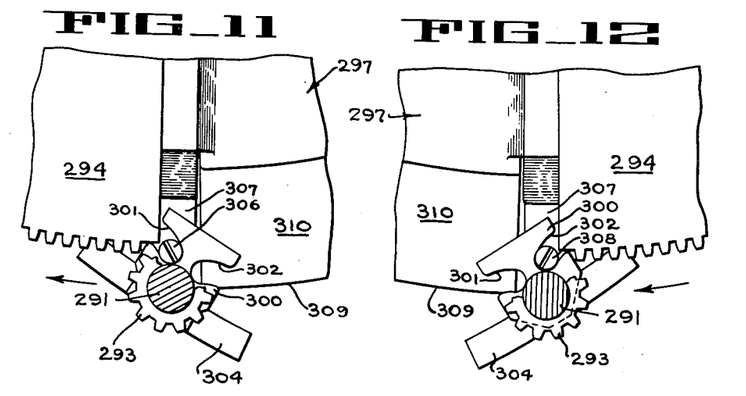
FIG. 11 is a fragmentary section taken along lines 11—11 of FIG. 10 at the beginning of the gear segment of the stemming tube drive mechanism.
FIG. 12 is a fragmentary sectional view, similar to FIG. 11, but taken at the end of the gear segment of the stemming tube drive mechanism.
Figure 13:
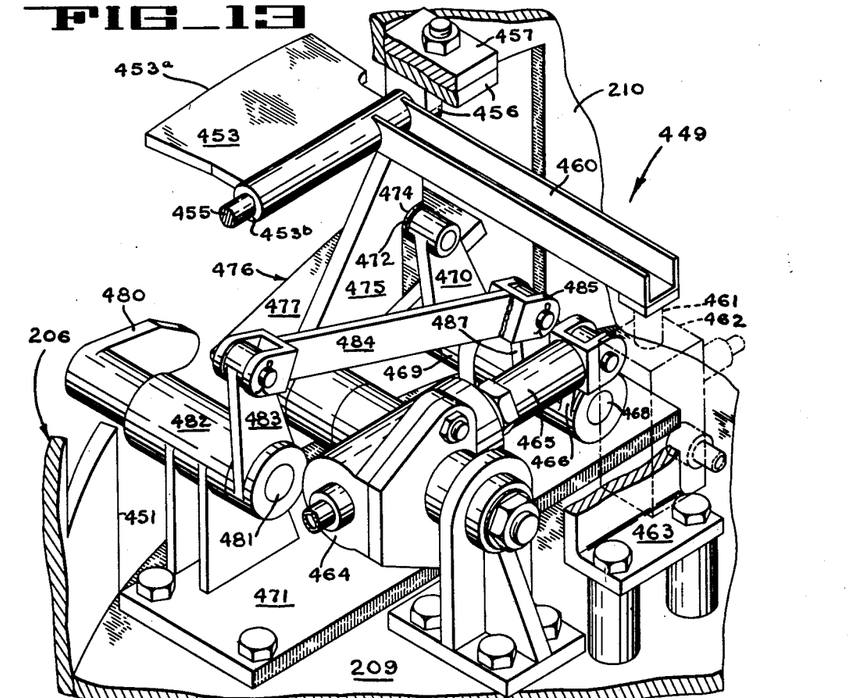
FIG. 13 is an enlarged fragmentary perspective of the control mechanism disposed in a drum at the upper end of the fruit preparation machine of FIG. 1.

Each gear 293 is brought into smooth engagement with the gear segment 294 by means of a synchronizing block 300 (FIG. 10) that is secured to the lower face of the gear 293. The block 300 has two recesses 301 and 302 (FIG. 11) that open in opposite directions. A T-shaped locking bar 304 is secured to the bottom of the block 300. As the gear 293, which is being carried by the turret, approaches the entrance end of the gear segment, the recess 301 of the block 300 engages a pin 306 that is mounted in upright position on a bracket 307 (FIG. 10) secured to the stationary circular mounting member 297. The pin 306 is so positioned relative to the first tooth of the gear segment that the block 300 will be engaged and rotated, as shown in FIG. 11, to bring the teeth of the gear 293 into smooth meshing engagement with the teeth of the gear segment. It is to be noted that the locking bar 304 rotates with the gear 293 below the gear segment.

When the stemming tube 250 is not rotating, it must be held in a fixed position with the fins 251 disposed in a substantially vertical plane so that a forked butt clamp member, which will be described presently, can be moved longitudinally along the stemming tube past the fins. The stemming tube is held in this fixed position by means of the locking bar 304. It will be noted in FIG. 12 that, as the gear 293 moves toward the left and out of engagement with the gear segment 294, the recess 302 of block 300 receives a pin 308 which is mounted on the extension 307 of the circular mounting member 297. This contact of the pin with the walls of the recess causes the locking bar 304 to be rotated in a clockwise direction so that it is moved smoothly into engagement with the outer peripheral edge 309 of a plate 310 that projects outwardly from the circular mounting member 297. As seen in FIG. 4, the gear segment 294 extends around the stationary main shaft 205 for about 226°, while the locking plate 310 has an angular extent of about 134°.

*Butt Stop*

Just before a stemming tube is moved into a pear, it is necessary that the pear be pressed into the feed cup in which it is carried so that the nose of the pear will be centered in the cup and the stem-blossom axis of the pear will be aligned with the stemming tube. This pear centering operation is carried out by a butt stop lever 325 (FIGS. 5 and 8), which is a composite member comprising two parallel, juxtaposed members, an actuating bellcrank 326 (FIG. 5) and a pear-contacting butt stop arm 327. The bellcrank 326 has a hub 328 rotatable on the short shaft 269 which projects outwardly from the adjacent casting 236. One arm 329 of the bellcrank carries a roller 332 which rides in a cam groove 333 provided by two spaced horizontal straps 334 and 335 that are secured to and project outwardly from a cylindrical support member 336 which is secured to the drum 206. At its lower end the bellcrank 326 carries a roller 338 which rides in an elongated opening 339 formed in the lower end of the butt stop arm 327. At its lower end, the arm 327 has a forked butt stop 340 which has a slot 342 (FIG. 8), terminating in an enlarged recess 343. The butt stop 340 is in alignment with the stemming tube 250, which is adapted to pass through the enlarged recess 343. When the stemming tube is in its non-rotating, locked position with the fins 251 disposed in a vertical plane, the uppermost fin is aligned with the slot 342 and is adapted to pass therethrough.

Figures 5, 6, 7:
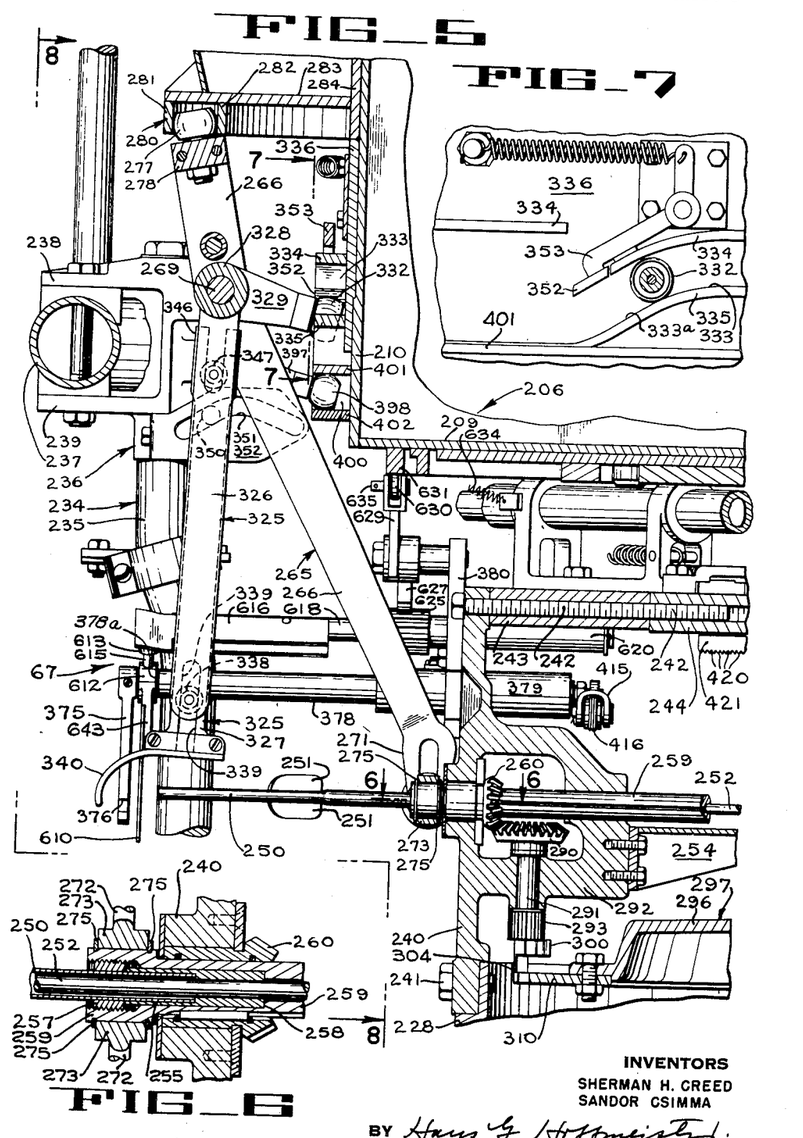
FIG. 5 is an enlarged fragmentary vertical section taken on line 5—5 of FIG. 2.
FIG. 6 is an enlarged sectional view taken on line 6—6 of FIG. 5.
FIG. 7 is a fragmentary vertical section taken on line 7—7 of FIG. 5.

The butt stop arm 327 has a forked upper end 346 (FIG. 5) which receives a roller 347 rotatably carried by the bellcrank 326. Thus, when the bellcrank 326 is pivoted about shaft 269, the upper roller 347 and the lower roller 338 carried by the bellcrank 326 cause the arm 327 to swing with the bellcrank. In order that the butt stop 340 of the arm 327 will move in a substantially straight line path as it pushes the pear, the arm 327 carries a roller 350 (FIG. 5) which projects laterally into a camming groove 351 in a plate 352 secured to the casting 236. As best seen in FIG. 5, the groove 351 has an ascending and a descending portion designed to cause the butt stop 340 to move in a straight line path as it moves longitudinally along the stemming tube 250. It will be understood that the camming groove 333, which actuates the butt stop bellcrank roller 332, has a configuration adapted to cause the butt stop to move radially inwardly or outwardly at predetermined times in coordination with the movement of other operating mechanisms.

It will be evident from FIG. 5 that, when the roller 332 is moved downwardly, the arm 327 is pivoted clockwise and the butt stop 340 is moved to the left to engage a pear in a feed cup. At this point the pear is gripped by the jaws of the cup 70 (FIG. 4) and its stem end may be out of contact with the tapered seat in the cup. The butt stop 340 (FIG. 5) engages the pear and forces it inwardly in the cup causing the stem end of the pear to engage the seat of the cup and the pear to be centered. In FIG. 7, a downwardly inclined portion 333a of the groove 333 is illustrated. As the roller 332 travels down this inclined portion of the groove, the butt stop 340 is moved into engagement with the pear. Near the lower end of the groove, the roller 332 contacts a shoe 352 which is formed on the end of a spring-loaded bellcrank 353 which causes the pressure of the butt stop 340 to be increased until the pear has been firmly seated. When the pear is seated, the bellcrank 353 will pivot clockwise and allow the roller 332 to pass thereunder, thus terminating the pressure of the butt stop on the pear. With this arrangement, the spring-loaded lever 353 assures the proper seating of the pear regardless of its size, and at the same time it prevents the application of excessive pressure to the pear.

*Nose Stop*

At the time the stemming tube of each processing unit 67 withdraws a pear from the feed cup, the pear is not fully seated on the stemming tube. Before the peeling operation can be started, the pear must be fully seated on the tube and the butt end of the pear must be positioned at the particular location at which the cutter begins its peeling operation. This seating and positioning of the pear is effected by means of a stem end gaging means or nose stop 375 (FIGS. 5, 8 and 9) which is in the form of a bar having a notch 376 at its outer end. At its inner end the bar is secured to a short shaft 377 (FIG. 9) projecting from the end of a tubular shaft 378 which is journalled for sliding and rotating movement in a tubular bushing 379 fixed on a plate 380 that is arranged to be bolted to the mounting plate 240 of the associated processing unit. The bore of the bushing 379 is aligned with openings in the plates 240 and 380. The tubular shaft 378 is moved back and forth in the bushing 379 by means of a bellcrank 382 that has a slot 383 disposed at the lower end of one arm and adapted to receive a pin 385 projecting from a collar 386. The collar is locked against axial movement on the shaft by snap rings 389, one only being shown. The bellcrank 382 has a hub 394 pivotally mounted on a stub shaft 395 (FIG. 8) projecting from the casting 236 at a point below the shaft 269 on which the butt stop bellcrank 325 pivots. The other arm 397 (FIG. 5) of the bellcrank 382 has a roller 398 mounted for rotation thereon, said roller being disposed in a stationary camming channel 400 which is formed by two horizontal plates 401 and 402 projecting from the exterior wall 210 of the drum 206. The stationary camming channel 400 is so designed that, as the processing unit is carried in a circular path, the bellcrank 382 is pivoted in a clockwise direction (FIG. 9) causing the tubular shaft 378 to move radially inwardly. When the nose stop 375 has reached a predetermined radially inward position, a pin 404 (FIG. 9), that is carried by the stationary bushing 379 and is disposed in a camming slot 405 in the tubular shaft 378, engages a slanted portion 406 of the slot, causing the shaft to be rotated to swing the nose stop to a position wherein the notch 376 in the nose stop is disposed around the stemming tube 250. After the nose stop is in this pivoted position, the bellcrank 382 is pivoted further in the clockwise direction to cause the nose stop to engage the stem end of the pear and push it further onto the stemming tube which is stationary during this particular interval.

It is to be noted in FIG. 9 that the tubular nose stop shaft 378 has a laterally extending yoke 415 secured to its radially inner end. A roller 416, that has three peripheral rings of V-shaped cross section, is rotatable in the yoke. When the nose stop bar 375 is swung up to a position of alignment with the stemming tube, the yoke 415 and the roller 416 are also swung upwardly to a position wherein the upper V-shaped edges of the rings on the roller are at the same level as a plurality of elongated V-shaped grooves 420 (FIG. 5) formed on the lower surface of a locking plate 421 that has a hub 422 (FIG. 3) secured by setscrews to the stationary main shaft 205. As seen in FIG. 4, the locking plate 421 is not completely circular but has an angular extent of about 238°. FIG. 5 is a view taken at the turret position at which impaling of the pear is begun and at this position the nose stop has not yet been moved radially inwardly. Since the locking plate 421 does not begin until approximately 48° after the impaling station, it is evident that upward swinging movement of the roller in FIG. 5 would not bring the roller 416 into contact with the V-shaped notches 420 of the locking plate. However, it will be understood that in each processing unit 67 the roller 416 is raised to a predetermined position as the nose stop is aligned with the stemming tube, and then it is moved radially inwardly, as the nose stop seats the pear, until it is in a radially inner position such that further rotation of the turrret will move the threads of the roller 416 into engagement with the V-shaped grooves 420 in the locking plate. When the roller 416 is engaged with the plate in this manner, the nose stop is locked against further radial movement until the subsequent peeling and stem cut-off operations are completed.

When the pear has been fully seated on the stemming tube by the inward pushing movement of the nose stop, the butt of the pear comes into contact with the butt stop which has been previously withdrawn to a predetermined radially inward position. At the time that the butt of the pear hits the butt stop, the processing unit has been rotated approximately 35° from the fruit impaling station to a station which will be called the pear positioning station since at this position the butt end of each pear, regardless of the length of the pear, will be positioned at the same predetermined radially inward position at which the peeling cutter begins the peeling operation.

Figures 14, 15:
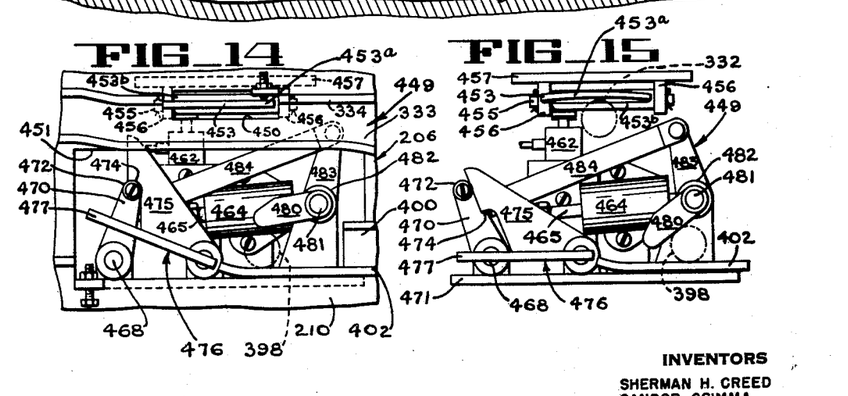
FIG. 14 is an enlarged side elevation taken along lines 14—14 of FIG. 2 showing a portion of the outer wall of the drum and access windows therein.
FIG. 15 is an enlarged fragmentary side elevation similar to FIG. 14 but showing another operational view of the mechanism, the wall of the drum being omitted for clarity.

The control mechanism 449 at the pear positioning station is particularly shown in FIGS. 2, 13, 14 and 15. At this station the wall 210 of the drum 206 (FIG. 14) has an upper small aperture 450 and a lower large aperture 451. A paddle 453 (FIG. 13) has a forward end portion 453a projecting through the small upper aperture 450 and has a tubular hub 453b disposed inside the drum 206. The hub 453b is pivoted on a pin 455 that is disposed in two spaced tabs 456 (FIG. 15) depending from a flange 457 secured to the inner surface of the wall of the drum. An actuator arm 460 (FIG. 13) is welded to the hub 453b and extends radially inwardly therefrom to engage the plunger 461 of a control valve 462 mounted in fixed position on a bracket 463. The control valve 462 is connected in an air pressure line leading to one end of a power cylinder 464 (FIGS. 13 and 14) which has a plunger 465 pivotally connected to an arm 466 that is secured to a shaft 468. The shaft 468 is journalled for rotation in a bushing 469 that is fixed to a mounting plate 471. Also secured to the shaft 468 is a latch arm 470 (FIG. 14). At its free end the latch arm 470 carries a roller 472 adapted to engage a shoulder 474 formed on a control arm 475 of a compound lever 476 that is pivoted on the mounting plate 471 and includes a ramp 477. It is to be particularly noted that the ramp 477 forms a continuation of the lower member 402 (FIG. 5) of the cam channel 400 in which the follower 398 of the nose stop 375 travels. Accordingly, when the follower 398 (shown in phantom lines in FIG. 14) rides up the latched ramp 477, the nose stop 375 is moved radially inwardly of the turret (FIG. 9) to engage the stem end of the pear and push it inwardly.

At the time the follower 398 of the nose stop 375 approaches the ramp 477 as seen in FIG. 14, the follower 332 of the butt stop bellcrank is disposed in the cam track 333 (FIG. 14) and is approaching the paddle 453 which forms a part of the upper wall 334 of the cam track 333. It is therefore evident that the substantially horizontal portion of the cam track 333 positions the butt stop in a predetermined radially inward position, ready to be contacted by the butt end of the pear as it is moved inwardly by the nose stop. Accordingly, as the nose stop follower 398 rides up the ramp, the nose stop bar 375 pushes the pear inwardly until the butt end of the year contacts the butt stop. The contact of the pear with the butt stop causes the butt stop bellcrank to be pivoted. The follower 332 engages and lifts the end portion 453a of the paddle 453 upwardly, causing the actuator arm 460 to be moved downwardly to actuate the air valve 462. When the air valve is actuated, air under pressure is directed to the right hand end of the power cylinder 464 (FIG. 14). As the plunger 465 is forced out of the cylinder 464, the latch arm 470 is moved from under the shoulder 474 of the lever 475, permitting the lever to swing counterclockwise and lower the ramp 477. When the ramp is lowered, the inward movement of the nose stop is terminated and the pear comes to rest in a predetermined position against the butt stop 340.

The pear positioning mechanism is moved back to latched position by means of an arm 480 (FIG. 15) that is keyed to a shaft 481 which is journalled in a hub 482 on the support plate 471. A second arm 483 is keyed to the shaft 481 and is pivotally connected to a link 484 (FIG. 13) that has a yoke 485 pivotally mounted on an arm 487 which is keyed to the same shaft 468 to which the latch arm 470 is keyed. Accordingly, as seen in FIG. 15, when the nose stop follower 398 of the next pear processing unit 67 contacts the arm 480, the shafts 481 and 468 will be rotated clockwise and the latch arm 470 will be swung clockwise, causing the roller 472 to ride along the edge of the control arm 475 to latched position under the shoulder 474.

On each pear processing unit 67, a peeling mechanism 500 (FIG. 8) is mounted alongside the stemming tube actuating lever arm 267. The peeling mechanism 500 includes a cutter assembly 501 (FIG. 8) and a cutter actuating mechanism 502 which swings the rotating cutter into position adjacent the butt end of the pear which is rotated by the stemming tube 250, moves the cutter up over the butt end as the butt end is peeled, and then moves the cutter longitudinally along the pear to the stem end. This peeling mechanism has been described in detail in the aforementioned parent application and therefore will not be repeated herein.

During a short interval at the very end of the peeling operation, the stem end of the pear is cut off by a blade 610 (FIG. 9) which is mounted on the nose stop shaft 378 by a collar 612 that is rotatable on a reduced diameter portion of the shaft and is locked between the nose stop 375 and a shoulder 378a (FIG. 5) formed on the shaft 378. A roller 613 is mounted on a pin 615 which projects radially outwardly from the collar 612, and this roller 613 is disposed in a channel-shaped actuator 616 that is formed on a shaft 618. At its radially inner end, the shaft 618 is journalled for rotation in a bushing 620 which projects outwardly from the mounting plate 380. A gear 625 is keyed to the shaft 618 and is in mesh with a gear segment 627 formed on one end of a rocker arm 629. At its other end, the rocker arm 629 carries a rotatable roller 630 that is arranged to ride along a camming surface provided by the lower edge of a strap 631 (FIG. 3) that is secured to the bottom wall of the drum 206. A spring 634 is connected between the pin 635 on which the roller 630 is mounted and an arm (not shown) secured to the processing unit next ahead. The camming surface is designed to control the movement of the blade 610 in a direction away from the stemming tube and to normally hold the blade 610 away from the stemming tube. When the stem cut-off station is reached, the follower 630 is released from the camming surface of the strap 631 which is relieved at the cut-off station whereby the rocker arm 629 is rotated counterclockwise (FIG. 9) by the spring 634 and the blade 610 is then swung inwardly through one side of the stem end of the pear to a position closely adjacent the stemming tube. A bolt 640 (FIGS. 8 and 9), that is threaded through a tab 641 on the collar 386, abuts a stop plate 642 that extends rearwardly from an arm 643 to which the knife 610 is secured. Since the pear itself is being rotated, the entire stem end will be quickly cut off.

The pear is then transferred from the stemming to the discharge turret 68 which successively performs the functions of splitting the pear, removing the seed-cell from the pear, trimming the blossom end of the pear, and then discharging the two halves of the pear onto the discharge chute 69.

Operation

The path of a single pear as it is processed will be traced through the machine, referring particularly to FIGS. 4, 5 and 9.

The pear is placed stem end down in a feed cup 70 which is disposed in a position wherein its axis is inclined at an angle of approximately 15° to the vertical. As the feed cup is carried in the direction of arrow A (FIG. 4) the cup is tilted to a horizontal position. When the cup is moving along that portion of its path that is adjacent the periphery of the main turret 66, and reaches a radial position R1 (FIG. 4), a processing unit 67 on the turret is moved into position opposite the cup, and the stemming tube 250 of the unit is moved radially outwardly from the main turret toward the pear in the cup. Before the stemming tube engages the pear, the butt stop 325 (FIG. 5) is moved radially outwardly from the turret by the bellcrank 326 to engage the butt or calyx end of the pear and push the pear further into the cup. In this manner, the stem end of the pear is seated in the frusto-conical seat of the feed cup, and the stem-blossom axis of the pear is aligned with the axis of the stemming tube 250.

The stemming tube, which at this point is locked against rotation with the fins 251 disposed in the plane of the slot in the butt stop, is moved radially outwardly of the turret by the lever 265 to impale the pear. The stemming tube reaches its outermost position at R2 (FIG. 4) when the feed cup has traveled approximately half way along that portion of its path that is concentric with the path of the periphery of the main turret. It is to be noted that the fins 251 of the tube may or may not be engaged in the pear at this time depending upon the size of the pear. However, at this point the tube must extend entirely through the pear since it must completely sever the core material from the pear during the impaling stroke.

Approximately at the time the stemming tube reaches its outermost position, the pear is released from the feed cup 70. After the pear is impaled on the stemming tube 250, the butt stop is moved radially inwardly of the main turret by the bellcrank 326 (FIG. 5), and the stemming tube is moved radially inwardly by the lever 265, withdrawing the pear from the open feed cup. As the stemming tube is moved radially inwardly, the stationary core ejector rod inside the stemming tube contacts the core material that was cut from the pear by the stemming tube, and causes it to be pushed out of the tube. After the stemming tube has reached its innermost position, the nose stop bar 375 is swung into position behind the stem end of the pear at R3 (FIG. 4), and the bellcrank 382 is actuated as the roller 398 (FIG. 14) rides up the ramp 477 to move the nose stop bar radially inwardly of the turret. The nose stop bar contacts the stem end of the pear and slides it along the stemming tube until the fins 251 (FIG. 5) are fully engaged in the pear. The inward movement of the pear on the stemming tube is stopped when the butt end of the pear engages the butt stop, which was previously retracted to its pear-positioning location. When the butt end of the pear contacts the butt stop, the follower 332 of the butt stop bellcrank 326 contacts the paddle 453 (FIG. 13) and thereby actuates the air-operated cylinder 464 which releases the ramp 477 and stops the inward movement of the nose stop bar. The ramp 477 is released between R3 and R4 (FIG. 4) depending upon the length of the pear.

When the nose stop bar 375 (FIG. 5) on shaft 378 was swung up behind the stem end of the pear, the yoke 415 on shaft 378 was also elevated. After the inward movement of the nose stop bar is terminated, continued rotation of the main turret brings the V-shaped rings on the yoke 415 into engagement with the grooves of the locking plate 421 (FIG. 5) shortly after position R4 (FIG. 4), whereby the nose stop bar is locked against radial movement relative to the turret and, accordingly, the pear cannot be pushed off the stemming tube during the peeling operation.

The pear is then peeled between stations R5 and R6 and just before the peeling operation is completed, the cutting blade 610 (FIG. 9) is swung upwardly to cut into the stem end of the pear so that the final revolutions of the pear will cause the stem end to be cut off at R6 leaving a square nose on the stem end of the pear.

After the stem end has been cut off, the gear 293 (FIG. 10) passes out of engagement with the gear segment 294, stopping the rotation of the stemming tube. The positioning bar 304 moves into engagement with the peripheral surface 309 to lock the stemming tube in a non-rotating position in which the fins 251 are disposed in a vertical plane. The pear is then transferred to the discharge turret 68 where the pear is split, cored and its blossom end is trimmed as described in the herein mentioned parent application.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired is:

1. In a fruit preparation machine, a support structure, an impaling tube mounted for rotation in said structure and adapted to support a pear impaled thereon with the stem-blossom axis of the pear disposed on the axis of said tube, a shaft journalled on said support structure adjacent said tube and being parallel therewith, a collar rotatable on said shaft, a cutter secured to said collar for movement toward and away from a pear on said tube, a cam follower connected to said collar, a track supporting shaft mounted for rotation in said structure and disposed adjacent to and parallel with said tube, a channel cam track secured to said track supporting shaft and having said cam follower disposed therein, cam actuated means connected between said track supporting shaft and said support structure for normally holding said cutter in a position spaced from said impaling tube, and resilient means connected between said cam actuated means and said support structure for rotating said track supporting shaft to move said cutter to a position adjacent said impaling tube from a position spaced from said impaling tube, and means connected to said impaling tube for rotating said impaling tube while said cutter is disposed close to said tube whereby to make a circular cut in the pear.

2. In a fruit preparation machine, a support structure, an impaling tube mounted for rotation in said structure and adapted to support a pear impaled thereon with the stem-blossom axis of the pear disposed on the axis of said tube, a shaft journalled on said support structure adjacent said tube and being parallel therewith, a collar rotatable on said shaft, a cutter secured to said collar for movement toward and away from a pear on said tube, a cam follower connected to said collar, a track supporting shaft mounted for rotation in said structure and disposed adjacent to and parallel with said tube, a channel cam track secured to said track supporting shaft and having said cam follower disposed therein, a gear keyed to said track supporting shaft, a gear segment meshing with said gear, a lever rotatably supported by said support structure and connected to said gear segment, a spring connected between said lever and said support structure for moving said cutter to a position adjacent said tube, cam means operatively connected to said lever for rotating said gear segment and said connected track supporting shaft to move said cutter to a position spaced from said impaling tube, and means connected to said impaling tube for rotating said impaling tube while said cutter is disposed close to said tube whereby to make a circular cut in the pear.

3. In a fruit preparation machine, a support structure, an impaling tube mounted for rotation in said structure and adapted to support a pear impaled thereon with stem-blossom axis of the pear disposed on the axis of said tube, a shaft mounted for rotary and sliding movement in said structure and disposed adjacent and parallel to said tube, gaging means rigidly secured on the end of said shaft and movable into position to contact the stem end of a pear for moving the pear along the impaling tube until the butt end of the pear is disposed in a predetermined position and for accurately determining the position of the stem end of the pear relatively to the butt end of the pear longitudinally of said tube, means connected to said shaft to move said gaging means, a cutter mounted for rotation on said shaft a predetermined distance longitudinally from said gaging means and arranged to be moved transversely toward and away from a pear on said tube independently of the rotary movement of the shaft, means operatively connected to said cutter to rotate said cutter to a position adjacent said impaling tube from a position spaced from said impaling tube, and means connected to said impaling tube for rotating said impaling tube while said cutter is disposed close to said tube whereby to make a circular cut in the pear at a predetermined distance from the stem end thereof.

4. In a fruit preparation machine, a support structure, an impaling tube mounted for rotation in said structure and adapted to support a pear impaled thereon with the stem-blossom axis of the pear disposed on the axis of said tube, a shaft mounted for rotary and sliding movement in said structure and disposed adjacent and parallel to said tube, gaging means rigidly secured on the end of said shaft and adapted to be moved into position to contact the stem end of a pear to accurately determine the position of the stem end of the pear considered longitudinally of said tube, means connected to said shaft for moving said gaging means into position against the stem end of the pear, a cutter mounted for rotation on said shaft and spaced longitudinally a predetermined distance from said gaging means and arranged to be moved toward and away from a pear on said tube, a cam follower connected to said cutter, a track supporting shaft mounted for rotation in said structure and disposed adjacent to and parallel with said tube, a channel cam track secured to said track supporting shaft and having said cam follower disposed therein, cam actuated means operatively connected to said track supporting shaft for controlling rotation of said track supporting shaft, resilient means connected between said cam actuated means and said support structure for moving said cutter to a position adjacent said impaling tube from a position spaced from said impaling tube, and means connected to said impaling tube for rotating said impaling tube while said cutter is disposed close to said tube whereby to make a circular cut in the pear at a predetermined distance from the stem end thereof.

5. In a fruit preparation machine, an impaling tube journalled for rotation and adapted to support a pear with the stem-blossom axis of the pear disposed on the axis of said tube, a shaft mounted for rotary and sliding movement and disposed adjacent and parallel to said tube, gaging means rigidly secured on the end of said shaft, means connected to said shaft to rotate said shaft and locate said gaging means in a position in longitudinal alignment with the pear, drive means releasably connected to said shaft for sliding said shaft and gaging means longitudinally of said tube causing said gaging means to contact the stem end of the pear and move the pear along said tube, a pivotally mounted butt stop disposed in position in the path of movement of the pear, means operatively connected between said butt stop and said drive means and effective to release said shaft from said drive means upon contact between the butt end of the pear and said butt stop, a cutter mounted for rotation on said shaft and spaced a predetermined distance longitudinally from said gaging means, means operatively connected to said cutter for moving said cutter independently of said shaft to a position adjacent said tube from a position spaced from said tube, and means connected to said tube for rotating said tube while said cutter is disposed close to said tube whereby to make a circular cut in the pear at a predetermined distance from the stem end thereof.

References Cited in the file of this patent

UNITED STATES PATENTS

| | | |
|---|---|---|
| 2,742,067 | Coons et al. | Apr. 17, 1956 |
| 2,901,014 | Coons et al. | Aug. 25, 1959 |
| 2,905,216 | Freeman et al. | Sept. 22, 1959 |